United States Patent Office 3,520,020
Patented July 14, 1970

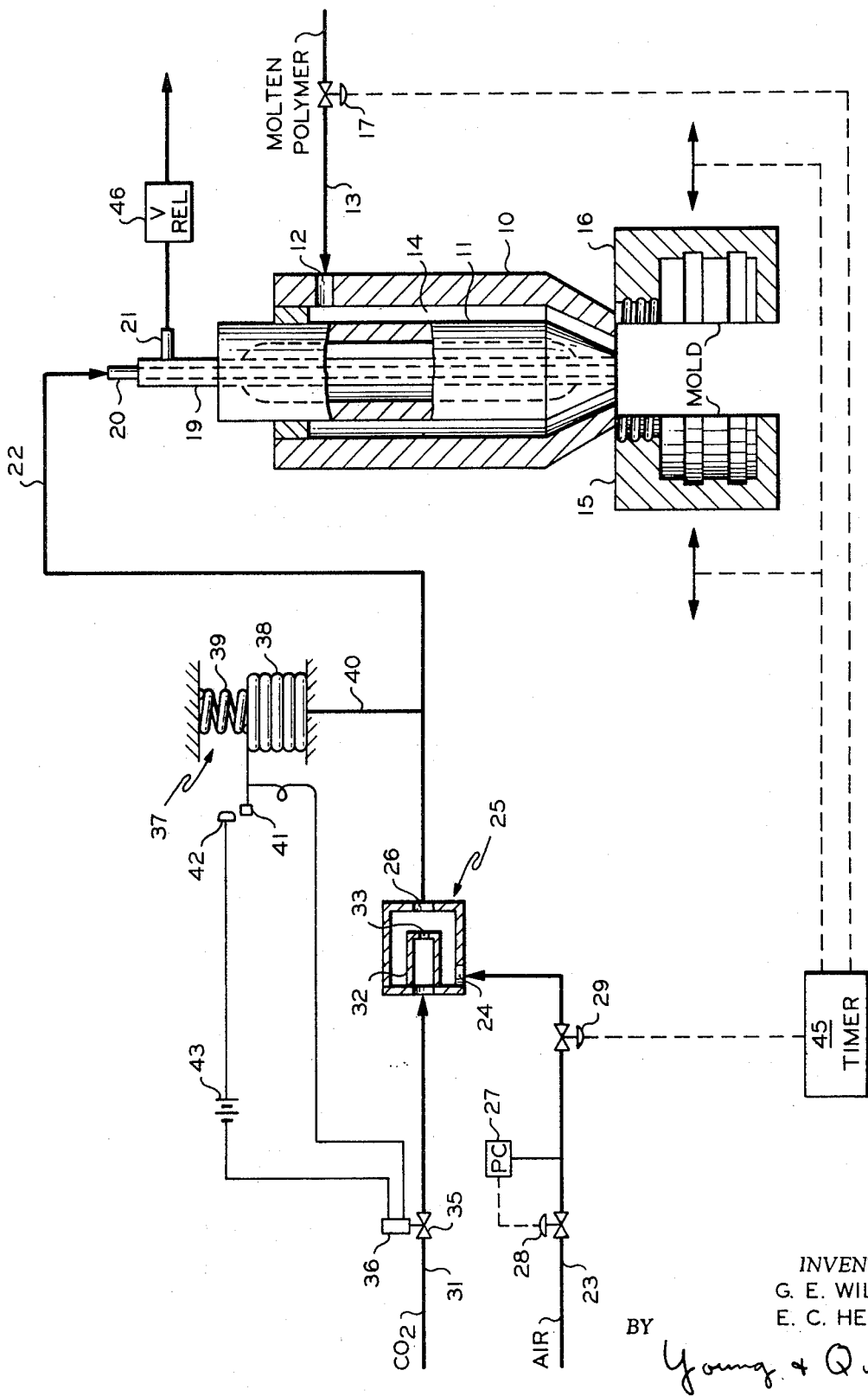

3,520,020
APPARATUS FOR COOLING THERMOFORMED ARTICLES
George E. Williams and Edward C. Held, Jr., Bartlesville, Okla., assignors to Phillips Petroleum Company, a corporation of Delaware
Filed Jan. 22, 1968, Ser. No. 699,525
Int. Cl. B29c 17/07; B29d 23/03
U.S. Cl. 18—5
4 Claims

ABSTRACT OF THE DISCLOSURE

Cooling fluid, such as liquid carbon dioxide, is introduced into thermoformed articles to aid in cooling. A pressure switch in the blowing fluid conduit introduces the cooling fluid when the pressure of the blowing fluid reaches a first value and stops flow of the cooling fluid when a second higher pressure is reached.

---

It is common practice to manufacture articles of various configurations by thermoforming thermoplastic materials. In the manufacture of hollow containers, for example, a heated parison of a thermoplastic materail can be placed in a mold and deformed into the configuration of the mold by the application of pressure and/or vacuum. After cooling, the article is removed from the mold. In commercial operations of this type it is important to reduce the cooling cycle as much as possible in order to reduce the manufacturing cost. To this end, it has been proposed to introduce a cooling fluid, such as liquid carbon dioxide, into the expanded parison to effect more rapid cooling. The introduction of the cooling fluid is usually regulated by means of a timer, such as described in U.S. Pat. 3,065,501.

In view of the fact that liquid carbon dioxide is a relatively expensive material, it is important to provide accurate control over the amount of such material employed. It has been found that timers do not provide the degree of control desired in many commercial operations. If the timing cycle is too long, excessive amounts of carbon dioxide are used. If the timing cycle is too short, the cooling cycle is lengthened or inadequate cooling results. The latter can result in containers of uneven configuration.

In accordance with the present invention, an improved method is provided for controlling the introduction of cooling fluid into contact with articles manufactured by thermoforming processes. This is accomplished by the use of a pressure switch which is actuated by the pressure of the blowing fluid. The pressure switch controls a valve in the line which introduces the cooling fluid into the blowing fluid. The pressure switch can be adjusted so as to permit introduction of cooling fluid during the period that the blowing pressure is building up to the desired value. When the blowing pressure reaches this value, the introduction of cooling fluid is discontinued. This provides a positive control of the amount of cooling medium employed with respect to the blowing fluid pressure.

Accordingly, it is an object of this invention to provide an improved apparatus for cooling articles fabricated by thermoforming processes.

Another object is to provide apparatus for controlling the introduction of cooling fluid in a thermoforming operation.

Other objects, advantages and features of the invention should become apparent from the following detailed description, taken in conjunction with the accompanying drawing which is a schematic representation of an embodiment of the apparatus of this invention.

Referring now to the drawing in detail, there is shown a housing 10 which encloses a mandrel 11. Housing 10 is provided with an inlet port 12 into which molten polymer, such as a normally solid olefin polymer, is introduced through a conduit 13. The polymer flows downwardly through an annulus 14 between housing 10 and mandrel 11 such that a hollow tube emerges from the bottom of the housing. Mold halves 15 and 16 are positioned beneath housing 10 to enclose the extruded parison. After a parison has been extruded, the two mold halves are moved together by suitable means, not shown in detail, to clamp the parison inside the mold. At this time, the flow of polymer into the housing is terminated, such as by closing a valve 17 in conduit 13.

A first hollow tube 19 extends through mandrel 11 and terminates adjacent the lower end of the mandrel. A second hollow tube 20 is positioned within tube 19 and spaced therefrom such that an annulus is formed between the two tubes. An outlet port 21 is connected to this annulus. A conduit 22 communicates with tube 20 to supply a fluid under pressure to expand the parison into engagement with mold halves 15 and 16. This blowing fluid is introduced after the mold halves are closed about the extruded parison.

An inlet conduit 23 supplies air under pressure to the system. This conduit is connected to the inlet port 24 of a mixing chamber 25. Conduit 22 extends from the outlet port 26 of the mixing chamber and tube 20. A pressure controller 27 adjusts a valve 28 in conduit 23 to maintain the blowing air at a preselected pressure. Pressure controller 27 is provided with an adjustable set point to permit the pressure to be varied. A control valve 29 is also disposed in conduit 23. A cooling medium, such as liquid carbon dioxide, is introduced through a conduit 31 which communicates with a tube 32 that extends into mixing chamber 25. Tube 32 is provided with an outlet orifice 33 through which the carbon dioxide flows into the mixing chamber. This orifice is generally quite small in diameter, of the order of 0.02 inch for example, and serves to permit vaporization of the carbon dioxide flowing therethrough. However, the size of this orifice depends on the volume of gas needed to fill the mold and the desired air to carbon dioxide ratio. While carbon dioxide is a preferred cooling fluid because it is generally available and relatively inexpensive, other condensable gases can be employed if desired.

A control valve 35, which can be operated by a solenoid 36, is disposed in conduit 31 to control the flow of liquid carbon dioxide into the mixing chamber. A pressure switch 37 communicates with conduit 22 and controls the opening of valve 35. This pressure switch can be in the form of a bellows 38 which expands and contracts in opposition to a spring 39, the interior of the bellows being connected to conduit 22 by a conduit 40. A movable electrical contact 41 is moved by expansion of bellows 38 to engage a stationary contact 42. When contacts 41 and 42 are in engagement, a circuit is completed between solenoid 36 and a current source 43. When the pressure in conduit 22 increases to a first preselected value, bellows 38 expands to move contact 41 into engagement with contact 42. When a second larger pressure is reached, contact 41 moves beyond and out of engagement with contact 42.

The illustrated apparatus can be controlled by means of a timer 45 which regulates valve 29, valve 17 and the opening and closing of mold halves 15 and 16. At the start of the cycle, valve 17 is opened to permit polymer to pass through housing 10 to form a parison. Valve 29 is closed at this time, as is valve 35. When the parison has been extruded, valve 17 is closed and mold halves 15 and 16 are moved together to form a mold which encloses the parison. Valve 29 is then opened to permit blowing air to enter tube 20. The opening of valve 29 results in a rapid increase of air pressure in conduit 22, and this in turn moves contact 41 into engagement with contact 42. At this time, solenoid 36 is energized to open valve 37 to introduce carbon dioxide into conduit 22. When the pressure reaches a second higher value, contact 41 moves out of engagement with contact 42 to close valve 35. A relief valve 46 is provided in vent conduit 21 to vent the blowing and cooling fluid if an excessive pressure is reached. This also serves as a safety feature. After the parison has been expanded, valve 29 is closed. Mold halves 15 and 16 are opened after sufficient time has passed to permit the article to be cooled to an acceptable temperature.

An important feature of this invention resides in the fact that the introduction of cooling fluid is controlled in response to the pressure of the blowing fluid. For example, pressure controller 27 can be set to supply air at a pressure of 45 pounds per square inch. In this example, pressure switch 37 can be adjusted such that solenoid 36 is energized when a pressure of the order of 5 to 15 pounds per square inch is reached and is deenergized when a pressure of 40 pounds per square inch is reached. The amount of cooling fluid introduced can be regulated by adjustment of retaining spring 39 and/or the relative sizes of contactors 41 and 42. Of course, other types of pressure switches, such as bourdon tubes, can be employed for this purpose. Of course, the amount of cooling fluid employed depends on such factors as the thickness of the parison, the heat conduction properties of the parison, and the temperature of the parison. The use of the pressure switch also serves an important function in that it prevents loss of cooling fluid in the event of a ruptured parison in the mold which reduces the pressure.

While the invention has been illustrated in conjunction with the forming of hollow containers by blow molding, it can be used equally well in other types of thermoforming operations. For example, the invention can be employed to advantage in the formation of hollow containers from two sheets of material by a procedure of the type described in U.S. Pat. 3,099,043 wherein blowing air is introduced into the vent ports to assist in expanding the thromoplastic sheets into engagement with the molds.

While this invention has been described in conjunction with presently preferred embodiments, it obviously is not limited thereto.

What is claimed is:

1. Apparatus for forming articles by thermoforming bodies of thermoplastic material, comprising a mold, means to insert a body of thermoplastic material into said mold, first conduit means communicating with the interior of said mold to supply a first fluid under pressure to force said body of thermoplastic material into contact with the mold, second conduit means communicating with said first conduit means to permit introduction of cooling fluid into said first conduit means, a valve positioned in said second conduit means, a pressure switch in said first conduit means downstream of the junction with second conduit means, and means responsive to said pressure switch to open said valve when the pressure sensed by said pressure switch reaches a first preselected value and to close said valve when the pressure sensed by said pressure switch reaches a second preselected value which is greater than said first preselected value.

2. The apparatus of claim 1, further comprising a mixing chamber in said first conduit means at the junction with said second conduit means, and flowing restriction means in said second conduit means at said mixing chamber to permit expansion of fluid passed through second conduit means into said mixing chamber.

3. The apparatus of claim 1, further comprising pressure regulating means in said first conduit means upstream from the junction with said second conduit means to maintain the fluid introduced through said first conduit means at a predetermined pressure.

4. The apparatus of claim 1 wherein said means to introduce a body of thermoplastic material into the mold comprises a die positioned adjacent the mold to extrude a parison of thermoplastic material into the mold.

References Cited

UNITED STATES PATENTS

| | | | |
|---|---|---|---|
| 3,127,458 | 3/1964 | Scott et al. | 18—5 X |
| 3,233,416 | 2/1966 | Rainwater et al. | 18—5 X |
| 3,246,062 | 4/1966 | Scott et al. | 18—5 X |
| 3,450,805 | 6/1969 | Chesser | 18—5 X |

WILBUR L. McBAY, Primary Examiner

U.S. Cl. X.R.

264—94